Patented Jan. 6, 1931

1,787,519

UNITED STATES PATENT OFFICE

HANS HAHL, OF ELBERFELD, GERMANY, ASSIGNOR TO WINTHROP CHEMICAL COMPANY, INC., OF NEW YORK, N. Y., A CORPORATION OF NEW YORK

NEW BASIC PHENOL ALKYL ETHERS

No Drawing. Application filed January 19, 1929, Serial No. 333,752, and in Germany January 25, 1928.

The present invention relates to the manufacture of new basic phenol alkyl ethers.

I have found that new and valuable pharmaceutical products, being basic phenol alkyl ethers, are obtainable by reacting upon a compound of the general formula

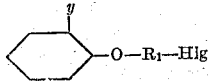

wherein $R_1$ represents an alkylene radical containing at least two carbon atoms, $y$ stands for an unsaturated aliphatic residue, such as the allyl-, crotyl- or propenyl group and wherein the benzene nucleus may be substituted for an alkoxy group, with a primary aliphatic amine, whereby it is to be understood, that under the term "aliphatic amine" saturated aliphatic amines, such as ethyl-amine, propyl-amine, isobutyl-amine, as well as unsaturated aliphatic amines, such as allyl-amine and the like are intended to be included.

The reaction may be performed by causing the starting materials to react with one another at normal or elevated temperature with or without the addition of suitable organic solvents, such as alcohol, ether, benzene and the like.

The products thus obtainable which probably correspond to the general formula

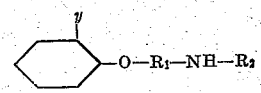

wherein $R_2$ means the residue of an aliphatic hydrocarbon, wherein R and $y$ are defined as above and wherein the benzene nucleus may be substituted by an alkoxy group, generally form colorless to weakly colored oily substances of strong basic properties, yielding with acids, especially hydrochloric acid, well crystallized colorless salts.

The following examples illustrate my invention without limiting it thereto, the parts being by weight:—

*Example 1.*—20 parts of the β-bromo-ethylether of 6-allyl-2-methoxy-1-hydroxy-benzene are heated for some time with 20 parts of mono-ethyl-amine in a closed vessel to 120–130° C. The reaction liquid is then poured into water, rendered acid to litmus with diluted hydrochloric acid and extracted with ether. The remaining aqueous solution is treated with caustic soda until the reaction product is strongly alkaline and extracted with ether again. The separated oil is then removed, dried and distilled.

The monoethylamino-ethylether of 6-allyl-2-methoxy-1-hydroxy-benzene of the probable formula

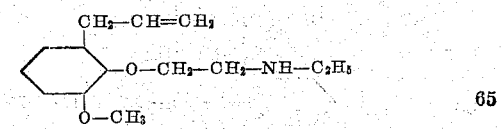

distills under a pressure of 10 mm. at a temperature of 159–161° C. as a pale yellow colored liquid. The base readily dissolves in acids giving neutral salt solutions, from which solutions the salts, especially the hydrochloric acid salt, can be easily isolated in the usual manner in form of well crystallizing colorless compounds.

*Example 2.*—20 parts of the β-bromo-ethylether of 6-allyl-2-methoxy-1-hydroxy-benzene are heated with 5 parts of allyl-amine in a closed vessel to 120–130° C. for about 5 hours.

The reaction liquid is then poured into diluted hydrochloric acid, extracted with ether, and the remaining aqueous solution is rendered alkaline by means of sodium hydroxide and extracted with ether again. The ethereal solution is then dried, the ether distilled off and the oily residue is distilled in vacuo (10 mm.), whereby the mono-allyl-amino-ethyl-ether of 6-allyl-2-methoxy-1-hydroxy-benzene distills as a nearly colorless oil between about 170–174° C.

I claim:—

1. The new products having in their free form the probable formula

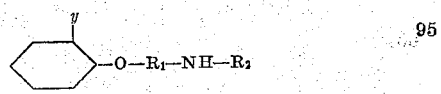

wherein $R_1$ represents an alkylene radical containing at least two carbon atoms, $R_2$ stands for an aliphatic hydrocarbon residue, $y$ represents an unsaturated aliphatic residue and wherein the benzene nucleus may be substituted by an alkoxy group, said products generally forming colorless to weakly colored oily substances of strong basic properties, yielding with hydrochloric acid well crystallized colorless salts, exerting valuable pharmaceutical properties.

2. The new products having in their free form the probable formula

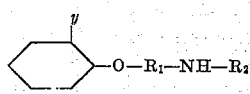

wherein $R_1$ represents an alkylene radical containing at least two carbon atoms, $R_2$ stands for an aliphatic hydrocarbon residue, $y$ stands for one of the groups allyl and crotyl and wherein the benzene nucleus may be further substituted by an alkoxy group, said products generally forming colorless to weakly colored oily substances of strong basic properties, yielding with hydrochloric acid well crystallized colorless salts, exerting valuable pharmaceutical properties.

3. The new product having in its free form the probable general formula

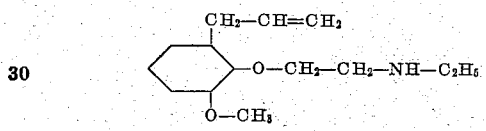

said product forming a pale yellow colored liquid, distilling under a pressure of 10 mm. at 159–161° C.

In testimony whereof I have hereunto set my hand.

HANS HAHL. [L. S.]